(12) United States Patent
Boldyrev et al.

(10) Patent No.: US 8,401,934 B2
(45) Date of Patent: Mar. 19, 2013

(54) METHOD AND APPARATUS FOR INFORMATION AND COMPUTATION CLOSURES ACCOUNT MANAGEMENT

(75) Inventors: Sergey Boldyrev, Söderkulla (FI); Nikolai Grigoriev, Brossard (CA); Ian Justin Oliver, Söderkulla (FI); Mika Juhani Mannermaa, Burlington, MA (US); Ora Lassila, Hollis, NH (US)

(73) Assignee: Nokia Corporation, Espoo (FI)

( * ) Notice: Subject to any disclaimer, the term of this patent is extended or adjusted under 35 U.S.C. 154(b) by 153 days.

(21) Appl. No.: 12/829,923

(22) Filed: Jul. 2, 2010

(65) Prior Publication Data
US 2012/0005050 A1    Jan. 5, 2012

(51) Int. Cl.
*G07B 17/00* (2006.01)
*G06Q 40/00* (2006.01)
*G06Q 10/00* (2006.01)

(52) U.S. Cl. ....... 705/30; 705/7.11; 705/7.28; 705/7.38; 714/51

(58) Field of Classification Search ............. 705/7, 7.11, 705/7.28, 7.38, 30; 714/51
See application file for complete search history.

(56) References Cited

U.S. PATENT DOCUMENTS

| | | | | |
|---|---|---|---|---|
| 5,918,210 A | * | 6/1999 | Rosenthal et al. | 705/7.11 |
| 6,178,529 B1 | * | 1/2001 | Short et al. | 714/51 |
| 6,879,979 B2 | * | 4/2005 | Hindawi et al. | 707/779 |
| 7,827,125 B1 | | 11/2010 | Rennison | |
| 7,890,484 B1 | * | 2/2011 | Hall | 707/705 |
| 8,051,136 B2 | * | 11/2011 | Dingler et al. | 709/206 |
| 2010/0241827 A1 | | 9/2010 | Yu et al. | |
| 2010/0306278 A1 | | 12/2010 | Oliver et al. | |

FOREIGN PATENT DOCUMENTS

| | | |
|---|---|---|
| CN | 101114291 A | 1/2008 |
| EP | 1 308 844 A2 | 5/2003 |
| KR | 10-0791640 B1 | 7/2007 |

OTHER PUBLICATIONS

Forte, M., et al. "Using Ontologies and Web Services for Content Adaptation in Ubiquitous Computing" ScienceDirect, Published: Jun. 2, 2007, pp. 1-14.

International Search Report for corresponding PCT Application No. PCT/FI2011/050490, Oct. 6, 2011, pp. 1-6.

Schlosser M., et al. "A Scalable and Ontology-Based P2P Infrastructure for Semantic Web Services" Second International Conference on Peer-to-Peer Computing (2002), pp. 1-8.

(Continued)

*Primary Examiner* — Matthew Gart
*Assistant Examiner* — Reva R Danzig
(74) *Attorney, Agent, or Firm* — Ditthavong Mori & Steiner, P.C.

(57) ABSTRACT

An approach is provided for enabling the accounting of closures to support query requests established by a device. A computation processing and accounting infrastructure determines one or more closures based, at least in part, on a query request. One of the one or more closures based, at least in part, on one or more predetermined policies is selected to generate a response to the query.

15 Claims, 8 Drawing Sheets

OTHER PUBLICATIONS

Written Opinion for corresponding PCT Application No. PCT/FI2011/050490, Oct. 6, 2011, pp. 1-10.

A Mechanism for Managing and Distributing Information and Queries in a Smart Space Environment, Boldyrev et al., UBICC, http://www.ubicc.org/files/pdf/SSDS_journal_final_362.pdf, pp. 1-10.

Determining Information Signatures in Smart Spaces, Boldyrev et al., 2009 IEEE International Conference on Semantic Computing, Sep. 14-16, 2009, http://ieeexplore.ieee.org/stamp/stamp.jsp?tp=&arnumber=5298636, pp. 291-296.

* cited by examiner

METHOD AND APPARATUS FOR INFORMATION AND COMPUTATION CLOSURES ACCOUNT MANAGEMENT

BACKGROUND

Increasingly, more and more applications and services are being developed around the interactivity and interoperability of mobile devices, particularly in the area of information storage and retrieval amongst a select group of interconnected devices. One means of facilitating such interaction amongst a group of devices is through the configuration of individual and personal information spaces in which persons, groups of persons, etc. can place, share, interact and manipulate webs of information with their own locally agreed upon semantics. Interaction between devices within an information space readily enables the application of group defined semantics and organization of information at a local, rather than global level. Still further, an information space may be expanded into a computation space, wherein computational processing of data over the space may define the interaction amongst users. To enable computation, interacting devices must be able to at least operate upon the most basic or primitive processes (e.g., computation closures) within the information space to feasibly enable a seamless execution experience for the user. In many cases, an ability of the user to access certain information, perform more advanced computations from their device, or have access to computation resources of other devices can be associated with a willingness of the user to pay for such access. Accordingly, service providers and device manufacturers are challenged to enable accounting for distribution of closures among information and/or computation spaces according to paid status and/or other similar access restrictions.

SOME EXAMPLE EMBODIMENTS

Therefore, there is a need for an approach to enabling the accounting of closures to support query requests established by a device.

According to one embodiment, a method comprises determining to receive a query from a device. The method also comprises determining one or more closures based, at least in part, on the query, wherein the one or more closures are associated with at least one of an information space or a computation space. The method also comprises determining to select at least one of the one or more closures based, at least in part, on one or more predetermined policies. The method further comprises determining to generate a response to the query based, at least in part, on the selected at least one of the one or more closures.

According to another embodiment, an apparatus comprising at least one processor, and at least one memory including computer program code, the at least one memory and the computer program code configured to, with the at least one processor, cause, at least in part, the apparatus to determine to receive a query from a device. The apparatus is also caused to determine one or more closures based, at least in part, on the query, wherein the one or more closures are associated with at least one of an information space or a computation space. The apparatus is also caused to determine to select at least one of the one or more closures based, at least in part, on one or more predetermined policies. The apparatus is further caused to determine to generate a response to the query based, at least in part, on the selected at least one of the one or more closures.

According to another embodiment, a computer-readable storage medium carrying one or more sequences of one or more instructions which, when executed by one or more processors, cause, at least in part, an apparatus to determine to receive a query from a device. The apparatus is also caused to determine one or more closures based, at least in part, on the query, wherein the one or more closures are associated with at least one of an information space or a computation space. The apparatus is also caused to determine to select at least one of the one or more closures based, at least in part, on one or more predetermined policies. The apparatus is further caused to determine to generate a response to the query based, at least in part, on the selected at least one of the one or more closures.

According to another embodiment, an apparatus comprises means for causing, at least in part, determining to receive a query from a device. The apparatus also comprises means for causing, at least in part, determining one or more closures based, at least in part, on the query, wherein the one or more closures are associated with at least one of an information space or a computation space. The apparatus also comprises means for causing, at least in part, determining to select at least one of the one or more closures based, at least in part, on one or more predetermined policies. The apparatus further comprises means for causing, at least in part, determining to generate a response to the query based, at least in part, on the selected at least one of the one or more closures.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Figure 1:
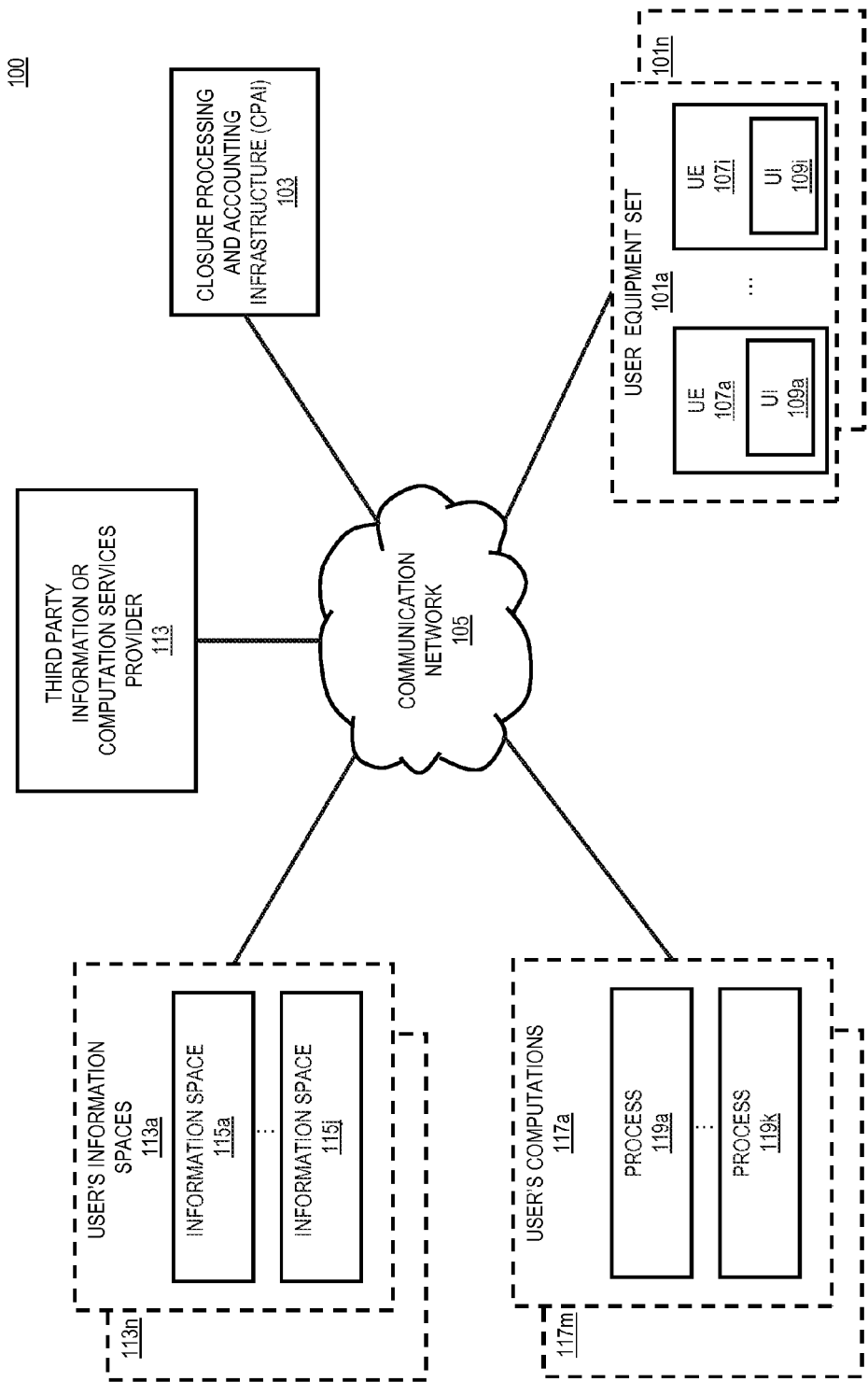
FIG. 1 is a diagram of a system capable of enabling the accounting of closures to support query requests established by a device, according to one embodiment.

A method, apparatus and software are provided for enabling the accounting of closures to support query requests established by a device. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "information space" refers to aggregated information sets from different sources. This multi-sourcing is very flexible since it accounts and relies on the observation that the same piece of information can come from different sources. For example, the same information (e.g., contact information for a particular contact) can appear in the same information space from multiple sources (e.g., a locally stored contacts database, a public directory, a work contact database, etc.). In one embodiment, information within the information space or smart space is represented using Semantic Web standards such as Resource Description Framework (RDF), RDF Schema (RDFS), OWL (Web Ontology Language), FOAF (Friend-of-a-Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces, it is contemplated that the approach described herein may be used with other structures and conceptual description methods used to create models of information.

As used herein, the term "computation closure" identifies a particular data retrieval and computation procedure together with relations and communications among various processes including passing arguments, sharing process results, flow of data and process results, etc. The computation closures (e.g., a granular reflective set of instructions, data, and/or related execution context or state) provide the capability of slicing of computations for processes and transmitting the computation slices between devices, infrastructures and information spaces.

As used herein, the term "computation space" refers to an aggregated set of computation closures from different sources. In one embodiment, computations within the computation space are represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. In one embodiment, an information space including aggregated computation closures is also known as a computation space.

As used herein, the term "smart space" refers to a combination of one or more information spaces and one or more computation spaces, wherein the computation spaces comprise computation closures that operate on the information in the information spaces. Although various embodiments are described with respect to information spaces, computation spaces and RDF, it is contemplated that the approach described herein may be used with other structures and conceptual description methods used to create models of information and computation.

FIG. 1 is a diagram of a system for enabling the accounting of closures to support query requests established by a device, according to one embodiment. As previously described, an information space consists of several distributed devices that communicate information (e.g. RDF graphs) via a shared memory such as a Semantic Information Broker (SIB) that contains the logic for supporting exchange of information among the distributed devices within an information or computation space. A device within an information space environment may store information locally in its own memory space or publish information to the semantic information broker. In the first case, the device is responsible for any process needed for combination or extraction of information, while in the second case the processes can be conducted by the semantic information broker. However, in many cases, the information may be organized as lists or sets of information that can include many data elements (e.g., a contact list, inventory of goods, business directory, etc.).

The basic concept of information space technology is that it enables a device user to facilitate information processing—i.e., provides access to distributed information from various sources, including local device data within the scope of the information space; in such a way that the distributed nature of the information is hidden from users and it appears to a user as if all the accessed information is stored on the same device. The information space, being distributed amongst multiple resources, also enables devices to access or operate upon data in excess of the device's own storage capacity, i.e., instances where the data was too large to be synchronized to the device. Still further, the information space also enables a user to have control over information distribution by transferring information between devices that the user has access to. For example, a user may want to transfer information among work devices, home devices, and portable devices. Current technologies enable a user of a mobile device to manipulate contexts such as data and information via the elements of a user interface of their user equipment. Execution of such processes, including the enabling of information distribution or access to information within the information space upon request, is facilitated by way of processing of one or more information closures.

In addition to information processing, a device user may also facilitate computation processing—i.e., distribution of computations and processes related to or acting on the data and information within the information space. As such, a user of an information space (e.g., an owner of a collection of information distributed over the information space) is able to control distribution of related computations and processes of, for instance, applications acting on the information. In one embodiment, an information space that includes computation closures can also be known as a computation space. For example, a contact management application that processes contact information distributed within one or more information or computation spaces is able to execute on the user's device (e.g., with all processes and computations of the application also executing on the same device) as well as distribute the related computations throughout the information space. So, fulfillment of a query within the contact management application that requires computation of a specific set of contact information may be effectively distributed amongst devices within the space, whereupon computations and/or information pertaining to the query are enabled by multiple devices. In a similar example, the computation closure is executed on a device holding the complete (large) list of contacts so only the computation results need to be sent back to the requesting application rather than requiring access to all data in order to perform the computation. Execution of such processes, including the enabling of computation distribution upon request, is facilitated by way of processing of one or more computation closures.

As used herein, "closures" refer to relations and communications among various processing activities, including activities such as but not limited to, passing arguments, sharing process results, data flow processing, etc. Once information or a computation is divided into its primitive closures, the processes within or represented by each closure may be executed in a distributed fashion and the processing results can be collected and aggregated into the result of the execution of the initial overall information or computation request. As information and computation spaces are based, at least in part, on the interoperability of the collection of distributed resources available over a network, the extent of access to closures by a device user over the space can vary. Indeed, the user may exercise discretion in defining the various resources that comprise their respective space, such as by adding or deleting resources to the space in which they are granted access. This may include, in some instances, adding and/or defining publicly available resources, including but not limited to media data websites, social networking sites, news outlets, search engines, contact management sites, data repositories, shopping sites, virtual or online applications and information processors, etc.

With this in mind, in certain instances a user may desire to perform executions that use information or computing closures made available by third party information or computation service providers. More specifically, executions such as queries or data requests that are spawned by certain software or information based applications available by the user device may be based on access to closures from sources other than, or in addition to, the user's defined space. Willingness by the user to access such closures may be provided by the service provider based on monetary, membership, contractual, advertising, subscription, software download, data exchange and/or other agreements and obligations. In one embodiment, provision of computing or information processing services from directly over the information or computation space or via third party resources, can use a standard infrastructure upon which monetization, usage, subscription and any of the other factors mentioned above can be properly accounted. More specifically, policies for regulating the access or distribution of information or computing closures are maintained across multiple network environments and resource types, be they of a public, private or shared to account for such factors.

To achieve this goal, a system 100 of FIG. 1 introduces the capability to enable the accounting of closures to support query requests established by a device based, at least in part, on a cost function. More specifically, the cost function is a deterministic process for affecting how computations are distributed within the information space amongst participating devices, based at least in part, on one or more accounting/access policies with respect to resources of the device, the computation space, one or more other devices with access to the computation space, or a combination thereof. In performing the distribution, means for enabling each computation to be deconstructed to its basic or primitive processes or computation closures are executed. Hence, as used herein, "computation closures" refer to relations and communications among various computations, including activities such as but not limited to, passing arguments, sharing process results, data flow processing, etc. Once a computation is divided into its primitive computation closures, the processes within or represented by each closure may be executed in a distributed fashion and the processing results can be collected and aggregated into the result of the execution of the initial overall computation.

In one embodiment, information or high context computations can be represented as closed sets of processes (e.g. transitive closures) such that closures can be executed separately (e.g. through distributed processing devices or equipment). The transitive closures can be traversed in order to present the granular reflective processes attached to each particular execution context. The mechanism of system 100 provides distributed deductive closures as a recyclable set of pre-computed, information or computing closures that can be distributed among various devices and infrastructures or shared among users of the information space by being stored on any storage locations related to the information spaces. Furthermore, the mechanism provides users with visual programming as fragments of computation or information, where each representation on the user interface can be bound to the computation or information closure it is based on.

As shown in FIG. 1, the system 100 comprises one or more sets 101*a*-101*n* of user equipment (UEs) UE 107*a*-107*i*, each having connectivity to third party information or computation service providers or platforms 113 as well as a closure processing and accounting infrastructure (CPAI) 103, which facilitates access to one or more information or computation spaces 113*a* and 117 respectively. Device connectivity is supported by way of a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UEs 107*a*-107*i* are any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, Personal Digital Assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 107*a*-107*i* can support any type of interface to the user (such as "wearable" circuitry, etc.).

In one embodiment, the UEs 107*a*-107*i* are respectively equipped with one or more user interfaces (UI) 109*a*-109*i*. Each UI 109*a*-109*i* may consist of several UI elements (not shown) at any time, depending on the service that is being used. UI elements may be icons representing user contexts such as information (e.g., music information, contact information, video information, etc.), functions (e.g., setup, search, etc.) and/or processes (e.g., download, play, edit, save, etc.). Additionally, each UI element may be bound to a context/process by granular migration. In one embodiment, granular migration enables processes to be implicitly or explicitly migrated between devices, information spaces, and other infrastructure. The process migration can be initiated for example by means of single-cast (e.g., to just another UE 107) or multicast (e.g., to multiple other UEs 107). Still further, process migration may be triggered via gesture recognition, wherein the user preselects a particular set of UI elements and makes a gesture to simulate "pouring" the selected UE elements from one device to another.

As seen in FIG. 1, a user of UEs 107a-107i may own, use, or otherwise have access to various pieces of information or computations distributed over a set 113a of information spaces 115a-115j. In the approach described herein, the information spaces 115a-115j may also be known as a "computation spaces" when one or more of the information spaces 115a-115j include one or more computation closures. The user can access the information via the set 101a consisting of UEs 107a-107i wherein each UE 107a-107i is equipped with one or more user interfaces (UI) 109a-109i. Furthermore, each UE 107a-107i may have access to a computation set 117a consisting of processes 119a-119k that can be used to manipulate the information stored in information spaces 115a-115j and produce results requested by the user of the UE 107.

In one embodiment, the computation processing support infrastructure 103 consists of information about computations 117a and processes 119a-119k for each UE 107a-107i. The information may include information such as input parameters, input types and formats, output types and formats, process structure, flow of data, communication means and parameter passing among processes 119a-119k, etc. The computation information enables a UE 107a-107i to divide computations into their primary computation closures, wherein each computation closure can be executed separately from other computation closures belonging to the same computation. For example, computations related to a music download may be divided into a search process for finding the most suitable download site, a verification process to determine whether the user is eligible for downloading from the site, an initialization process for verifying adequate resource (e.g. storage space) for the file to be downloaded, a process for verifying the type of the music file and associated playing environment, a process for determining whether the player is available on the UE 107, a process to activate the player after completion of the download, etc. In one embodiment, these processes or the computation closure derived from the processes may be executed independently from each other, i.e., by different devices, backend servers, etc. of the information space infrastructure.

Following execution of the independent processes, the data and parameters resulting from the execution can be exchanged to be able to aggregate results and make operation of the music application available in an information space environment. Moreover, division of the music-related computations into independent processes may vary based on factors such characteristics of the UE, restrictions of the download site, the music file type, the player type and requirements, etc. When the computing closures are serialized into, for instance, an information syntax such as RDF triples and stored via an information space, the information space incorporating the serialized computation closures are also known as a computation space.

By way of example, the UEs 107a-107i of sets 101a-101n, closure processing and accounting infrastructure (CPAI) 103, third party service providers 113 and the information spaces 113a-113n communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
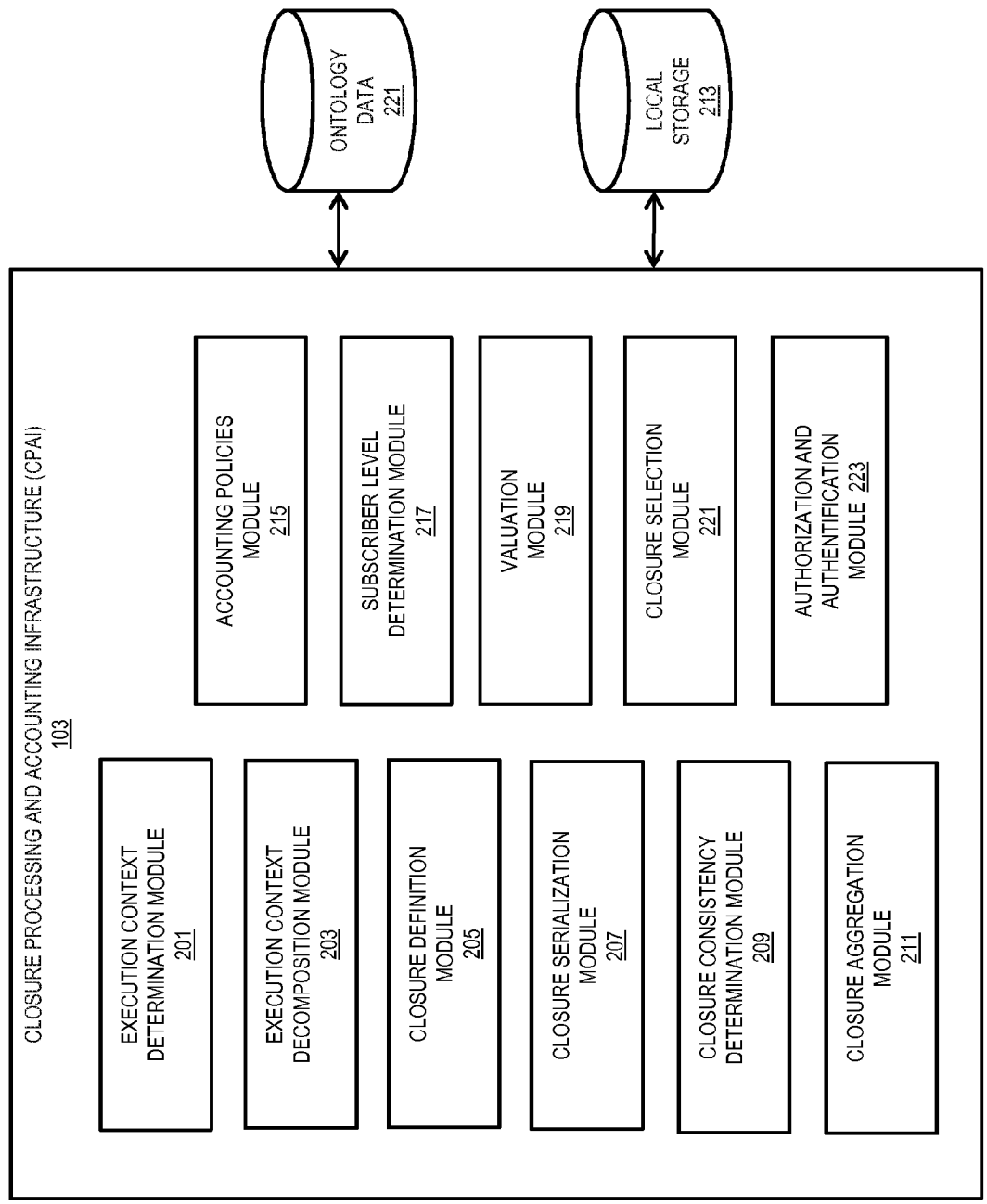
FIG. 2 is a diagram of the components of a closure processing and accounting infrastructure, according to one embodiment.

FIG. 2 is a diagram of the components of the closure processing and accounting infrastructure (CPAI), according to one embodiment. By way of example, the CPAI 103 includes one or more components for construction and aggregation of distributed computations. By way of further example, the CPAI 103 provides a means of supporting the accounting of information or computation closures, based on predetermined policies, for enabling any type of information or computation requests processing. It is contemplated that the functions of these components may be combined in one or more components or performed by other components of equivalent functionality. In this embodiment, the CPAI includes an execution context determination module 201, an execution context decomposition module 203, a closure definition module 205, a closure serialization module 207, a closure consistency determination module 209, a closure aggregation module 211, an accounting policies module 215, a subscriber level determination module 217, a valuation module 219, a closure selection module 221 and an authorization and authentication module 223.

The CPAI 103 receives a request for computation distribution. In one embodiment, the request may have been generated by a UE 107 based on a user gesture such as for example typing a keyword into an input section of a data retrieval or search based application via a graphical user interface. In another embodiment, the request for computation distribution may be generated by a component of an information space linked to the UE 107, by an independent component having connectivity to the UEs 107 and the information spaces via the communication network 105, or a combination thereof.

The request for computation distribution may include information about the computation that is going to be distributed, including input, output, processing requirements, etc. The request may also include information about the origin and the destination of a computation. For example, a user may want to distribute the computations associated with encoding a video file from one format to another (a typically highly processor and resource intensive task). In this example, the video file is stored in the user's information space 115 or otherwise available over the communication network 105 (e.g., downloaded from a source over the Internet), and therefore accessible from the UEs 107. Accordingly, the user may make a manual request to distribute the computations associated with the video encoding to one or more other devices, a backend server, cloud computing components and/or any other component capable of performing at least a portion of the encoding functions. Distribution may be carried out such that if a fast network connection is available, the video data can be copied to a more powerful device and encoded there, with the result being transferred back to the originating device. By way of example, a distribution request may be made from an originating device via a graphical user interface by dragging an icon or other depiction of the computations to command areas depicted in the user interface. These command areas, for instance, may be representative of physical or virtual locations of the other UEs 107 or devices that can support or perform the distributed computations. In other cases, the distribution can be initiated automatically by the system 100 based on one or more criteria via a request generator (not shown) in conjunction with the computation processing support infrastructure 103.

In one embodiment, following the receipt of the computation distribution request, the execution context determination module 201 retrieves and analyzes the information regarding the computation and determines the execution components involved in the computation. For the above example (encoding a video file from one format to another), the execution context may include video playing, audio playing, codec formatting, etc. and related settings, parameters, memory states, etc. The identified execution context may be stored in a local storage 213, in a storage space associated with the information space 113a-113n, sent directly to the execution content decomposition module 203 or a combination thereof.

In another embodiment, the execution context decomposition module 203 breaks each execution context into its primitive or basic building blocks (e.g., primitive computation closures) or the sub-processes of the whole execution context. For example, the video playing execution may be decomposed into computations or processes that support tasks such as, searching for available players, check the compatibility of video file with the players found, select the player, activate the selected player, etc. Each of the decomposed sub-processes may have certain specifications and requirements to effect execution of the processes in an information space 115 or computation space such as input and output medium and type, how parameters or results are to be passed to other processes, runtime environments, etc. In order for a process to be executed in a standalone fashion without being part of a larger process, a computation closure can be generated for the process. A computation closure includes the process and the specifications and requirements associated with the process that can be executed independently for subsequent aggregation.

In one embodiment, the closure definition module 205 generates computation closures for the sub-processes extracted by the execution context decomposition module 203 and stores the closures in the database 213. The stored closures may be used for slicing computations into smaller independent processes to be executed by various available UEs 107a-107i, using the data which may be stored on the distributed information spaces 115a-115j. Operating in connection with the closure definition module 205, monadic processing can be performed t computation closures to be encoded with specific functional data types based on processing rules that allow them to be chained together, such as to sequence the computation processing or regulate the control flow of computation processing. Also, operating in connection with the closure definition module 205, serialization module 207 utilizes the defined closures of module 205 and produces the serialized granular computation elements. The closure serialization process as performed by module 207 can also perform data marshalling as is necessary for ensuring data format consistency within a distributed environment. Pursuant to the serialization process, the processing state of each closure is also encoded and stored in the computation space.

In one embodiment, the closure serialization may be generated and stored using Resource Description Framework (RDF) format. RDF is a family of World Wide Web Consortium (W3C) specifications originally designed as a metadata data model. It has come to be used as a general method for conceptual description or modeling of information that is implemented in web resources; using a variety of syntax formats. The underlying structure of any expression in RDF is a collection of triples, each consisting of three disjoint sets of nodes including a subject, a predicate and an object. A subject is an RDF URI reference (U) or a Blank Node (B), a predicate is an RDF URI reference (U), and an object is an RDF URI reference (U), a literal (L) or a Blank Node (B). A set of such triples is called an RDF graph. Table 1 shows an example RDF graph structure.

TABLE 1

| Subject | Predicate | Object |
| --- | --- | --- |
| uri://....../rule#CD-introduction, | rdf:type, | uri://............/Rule |
| uri://....../rule#CD-introduction, | uri://....../rule#assumption, | "c" |

The granularity may be achieved by the basic format of operation (e.g. RDF) within the specific computation environment. Furthermore, the reflectivity of processes (i.e. the capability of processes to provide a representation of their own behavior to be used for inspection and/or adaptation) may be achieved by encoding the behavior of the computation in RDF format. Additionally, the context may be assumed to be partly predetermined and stored as RDF in the information space and partly be extracted from the execution environment. It is noted that the RDF structures can be seen as subgraphs, RDF molecules (i.e., the building block of RDF graphs) or named graphs in the semantic information broker (SIB) of information spaces. In certain embodiments serializing the closures associated with a certain execution context enables the closures to be freely distributed among multiple UEs 107 and/or devices, including remote processors associated with the UEs 107 by one or more user information spaces 113a-113n via the communication network 105.

The various above described modules of the CPAI 103, namely executable modules 201-211, operate associatively to generate one or more closures in response to specific applications or queries. Indeed, the array of closures available for selection and then use in response to fulfilment of a particular application or query request may vary; with different closures of different complexity being available to fulfil the same need. So, for example, a first information closure solution may be generated and/or acquired by the CPAI 103 in response to an information processing request that is of a lower complexity, and hence, of lesser informative detail. This is the case with certain internet/web resources, whereby they present to a user a limited set of information or detail in response to a request for said information, often requiring financial commitment, subscription, software download or other executions by the user in exchange for the full dataset. Alternatively, a second information closure solution may be generated and/or acquired that is of a higher complexity, and hence, of greater informative detail, such as in the case where a more complete dataset is offered to a subscriber of a resource. Hence, closures for fulfillment of the same request may vary according, but not limited to factors such as the nature of the query, the type of user from which the query originated, the type of application from which the query originated, the availability of closure sources change, the willingness of the user to operate within or above a particular cost threshold for a particular closure solution, etc. With this in mind, the proceeding paragraphs present one or more modules 215-223 for enabling the proper accounting, management, selection, regulation and authorization of closures as generated by the CPAI 103 in response to a query or other application need.

In one embodiment, various predetermined guidelines, rules, executions, agreements, etc. pertaining to the processing of information or computation closures are defined functionally, programmatically or procedurally by way of an accounting policies module 215. The accounting policies module 215 ensures that a standard rule base is applied for the benefit of acquiring data or resolving/executing a computation in response to a query. More specifically, by way of example, the accounting policies module 215 is an executable having functions for determining, retrieving and then operating upon accounting data in response to a query to be fulfilled. Factors, constraints, criteria or considerations to be accounted for in the context of a query, data request or other transaction may include, but is not limited to those pertaining to the monetization and cost of services or goods, usage of services or goods, subscription and access to services or goods, resource sharing of services or goods, etc. Data upon which the accounting policies module relies is predetermined and/or formulated based on common characteristics and considerations from various parties associated with a query request executed over the network 105 (e.g., information space). Accounting data may therefore be established by, but not limited to, the user making the request, a third party service provider to whom the request was associated, another user associated with the information or computation space, a policy group, a consortium or standards board, etc. Accounting requirements (including the cost of data access) can be also expressed in the form of data access policy obligations (using terminology from different policy frameworks such as XACML, Java XACML, GeoZACML, etc.).

The various predetermined guidelines, rules, executions, agreements, etc., upon which the accounting module 215 is configured, is based on ontology data 221. An "ontology," as used herein, is a formal representation of the knowledge by a set of concepts within a domain and the relationships between those concepts. It is used to reason about, or account for, the properties of that domain and may be used to describe the domain. In general, ontology data provides a shared vocabulary, which can be used to model a given domain—i.e., the type of objects and/or concepts that exist relative to that domain and their properties and relations. An ontology captures the structure of its own domain, by describing knowledge about the domain and defining a model of the domain with possible restrictions. More specifically, the ontology data 221 presents a framework or module from which the accounting module may perceive the domain of interest (i.e., an information space), an explicit specification of the intended meaning of the vocabulary, classification based information and constraints capturing background knowledge about the domain. The ontology data 221 presents, therefore, a formal and machine manipulable model, represented in the form of the accounting policies module 215.

By way of example, when a query is executed requiring the consideration of cost, pricing, monetization, etc. of information or computing closures, ontology data 221 pertaining to the monetization or cost of said closures informs the execution of the accounting policies module 215. As such, predetermined rules, executions, controls, measures, pricing models, etc., as regulated or accounted for by module 215 are applied accordingly respective to a the request. As another example, when a query is executed requiring the consideration of service and/or device usage or access to information or computing closures, ontology data 221 pertaining to usage or access to closures drives the execution of the accounting policies module 215. Regardless of domain, the context or the query as presented, the accounting policies module 215 enables the CPAI 103 to function based on a known ontology across any network environment and resource type, be they public, private or shared.

In one embodiment, the execution of a subscriber level determination module 217 allows the CPAI 103 to account for the type, profile, characteristics or other details regarding a particular user and/or device from which a request initiated. More specifically, the subscriber level determination module operates in conjunction with the authorization and authentication module to facilitate the gathering of data necessary for understanding the user and/or device associated with a query that requires one or more closures for fulfillment. In some instances, this data may already have been defined by the user during a prior engagement with the resource in question—i.e., the user established a profile and login with the resource in the past. In other instances, the user may be engaging with the resource for the first time, whether the resource is third party or directly within the information or computation space. Such data may then be utilized in connection with the accounting policies module 215 to further inform the closure accounting, reconciliation or regulation process. For example, in the context of monetary or cost considerations, determination of a user's subscriber level by module 217 enables a video data execution request as intended for distribution to only "premium" subscribers to be associated with the correct accounting policies corresponding to this level of subscription. In general, the subscriber level determination module 217 further drives the accounting policies module 215, particularly by restricting or narrowing the focus of the applied ontology dataset 221.

Still further, the subscriber level determination module 217 also maintains details regarding a user specified cost threshold and a customer lifetime value. The cost threshold refers to a maximum level of cost that a user is willing to assume respective to a particular closure solution. By way of example from the perspective of monetary considerations, the cost threshold may correspond to a particular "maximum currency value" that the user is willing to pay in accordance with a pricing model or cost index associated with the accounting policies module 215. As yet another example from the perspective of closure resource availability, the cost threshold may correspond to a particular "maximum time limit" or cost of waiting that the user is willing to assume in order to gain access to a particular closure resource, i.e., due to network or latency considerations. Indeed, the cost threshold is defined by the user directly or established as a default setting accordingly. In other instances, the cost threshold may be determined and established as an approximation based on historic consumption of closures or historic interactive tendencies with closure services providers.

In one embodiment, the subscriber level determination module 217 can also calculate and/or maintain a customer lifetime value (CLV) for each respective user as a metric of a user's overall consumption of specific closures. The CLV can also calculate or provide an indication of an extent of interaction between a user, a user's device or a user application associated therewith and one or more closure service providers, be they third party or locally accessible. As such, the subscriber level determination module 217 can enable closure service providers to more readily adapt to the needs of the requesting user, thereby enforcing increased granularity of closure results accordingly. For example, the customer lifetime value can be an indication of a historic rate of acceptance or consumption of specific closure types based on past query or application needs of the user. The customer lifetime value can then be used for determining, at least in part, the distribution and/or use of information or computation closures for subsequently performed queries of the same nature or context by the user. Resultantly, the granularity of closure results to be presented, recommended or enabled for use in relation to the query (e.g., as a granularity relevancy check) can be based, at least in part, on the known customization needs or preferences of the user as indicated per their CLV.

As yet another example, consider a user, device or application associated therewith whose profile, history, behavior, historic price points, etc. as provided, maintained or generated by the subscriber level determination module 217 reveal among other things, the following parameters:

The willingness on the part of the user or application associated therewith to pay more money for specifically tailored closure results (e.g., higher cost threshold);

That the user's device has above average processing capability for enabling the use and execution of more complex closures;

That the user generally prefers closures corresponding to a narrowly defined interval or timeframe of generation, (i.e., at the precise opening or closing of a particular stock market index);

The CLV, in this example, may be expressed mathematically and formulaically computed as a function of the above described parameters; the CLV result able to be shared with the user, service provider, or other entities associated with the query request to facilitate greater understanding of user or application needs.

Resultantly, the distribution of closures relative to the subscription level determination module 217 on the basis of at least the CLV or cost threshold, promotes direct interaction between the user and closure service provider based on enhanced user/customer understanding. In addition, the above described capabilities promote the granular collection of user data and analysis of said data relative to latency factors, so as to ensure that any determined benefits of one or more expected closures can be readily enabled for the user. Still further, the capabilities presented herein provides a means for closure service providers, whether third party or local, to steer their service offerings for optimal performance based on user specific cost accountability granular relevancy determination.

In one embodiment, the valuation module 219 valuates different closures that are generated and/or acquired (e.g., from third party resources) in response to a query or application need. Specifically, the valuation module enables the selection or rejection of closures based on various determining factors, including but not limited to: whether or not the closure best suits the query request or application need, whether the closure is within the cost threshold, whether the closure corresponds effectively to the determined customer lifetime value (CLV), whether the closure is provided by one or more external providers, whether the policies affecting the closures are available or up-to-date, etc. The valuation module 219 operates in connection with the subscriber level determination module 217 and accounting policies module 215 to effectively control which closure options are possible and best suited for distribution relative to the query based on user preferences and/or closure accounting needs.

In one embodiment, subsequent to the valuation procedure executed by the valuation module 219, the closure selection module 221 enables selection of a particular closure from amongst the various closure options available. Selection may, in certain instances, be user prompted, such as wherein the user selects a choice from amongst a list of options presented to them via a graphical user interface. In other instances, the selection is based on various of the determinations and considerations established respective to modules 215-219 of the CPAI 103. Selection of a particular closure by the selection module 221 corresponds to the process of determining to generate a response to the query based, at least in part, on the selected at least one of the one or more closures. Furthermore, as will be described subsequently, the selection module 221 may maintain a prioritized queue of respective closure solutions relative to query or application needs.

In one embodiment, an authorization module and authentication module 223 operates in connection with the closure selection module 221 to enable a selected closure to be authorized and/or authenticated for usage by the requesting device. The authorization process may entail performance of a payment, cost threshold or customer lifetime value verification, for the purposes of ensuring proper authority to commence with the execution of a selected closure with respect to the accounting policies governing the transaction. The closure authentication process may entail one or more of the following: confirming the identity of the (1) requesting device, user or application, or (2) tracing the origins of the closure provider, etc. to the provided closure is properly assembled, packaged and secure. In general, the authorization and authentication module 223 ensures that payment processing and closure access are performed seamlessly and securely between interacting devices and/or closure service providers within the information or computation space in response to a given query or application need.

Figure 3:
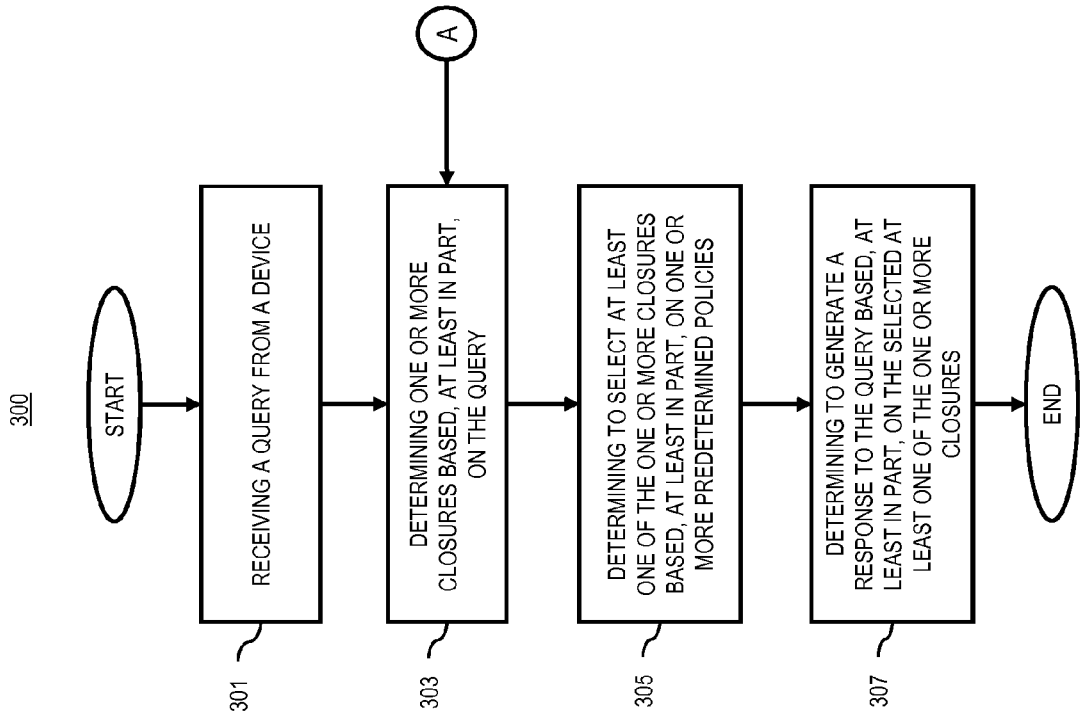
FIG. 3 is a flowchart of a process for enabling the accounting of closures to support query requests established by a device, according to one embodiment.
Figure 7:
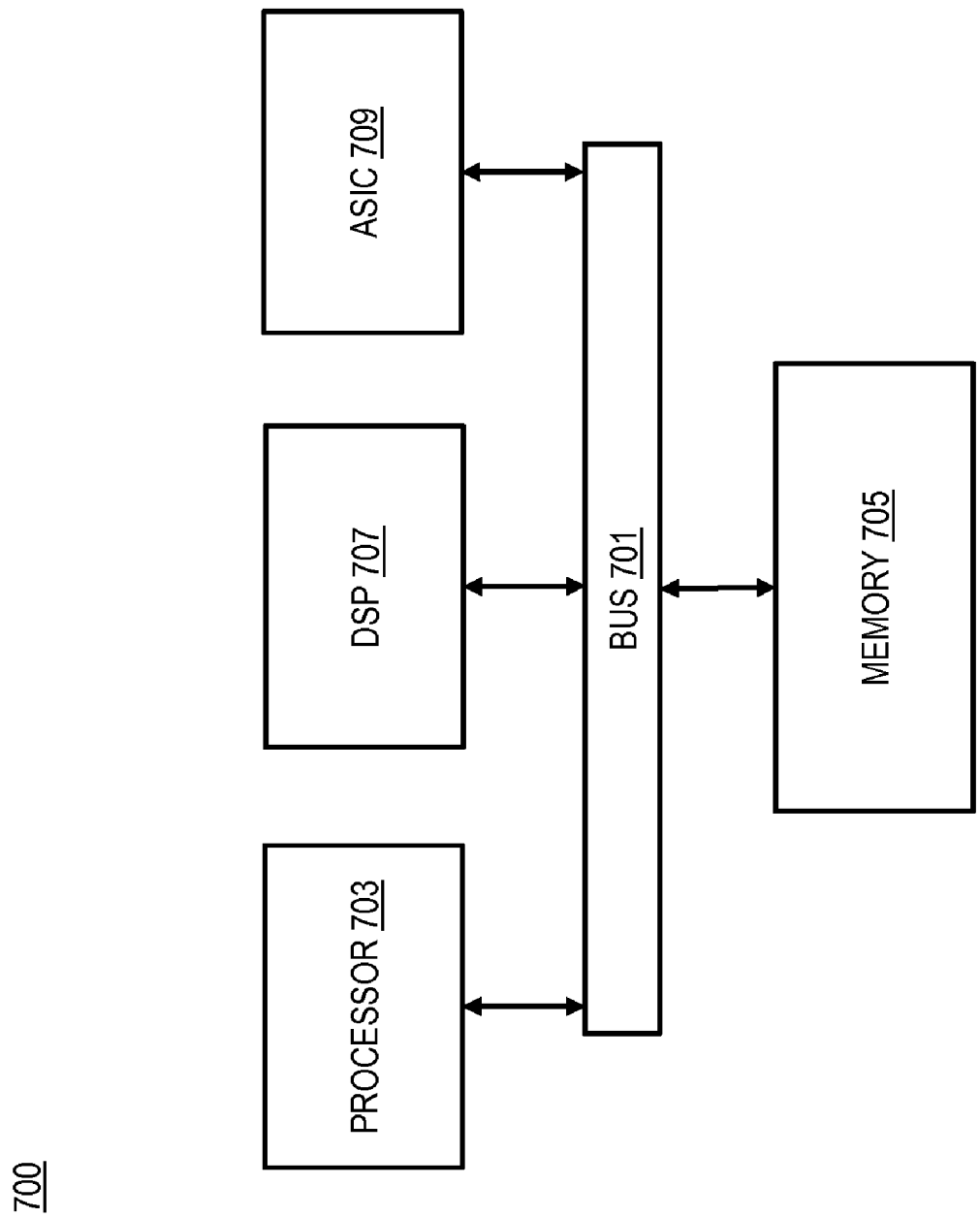
FIG. 7 is a diagram of a chip set that can be used to implement an embodiment of the invention.

FIG. 3 is a flowchart of a process for enabling the accounting of closures to support query requests established by a device, according to one embodiment. In one embodiment, the CPAI 103 performs the process 300 and is implemented in, for instance, a chip set including a processor and a memory as shown in FIG. 7. By way of example, this process 300 corresponds to modules 215-221 of the CPAI 103 of FIG. 2 as it operates to provide an effective framework for the management of generated or acquired closures. As a first step 301, a query is determined to be received from a device by the closure processing and accounting infrastructure (CPAI) 103. The query may indicate, at least in part, particular information or computing closure needs that are critical for or associated with fulfillment of the query request. Once determined to be received, step next step 303 entails determining one or more closures based on the query. This determination may be based, at least in part, on valuation of various available closure options relative to the query, accounting policy and cost considerations, etc. As a next step 305, at least one of the one or more closures is determined to be selected for use in responding to the query. As a further step 307, having determined at least one closure to select, a response to the query is determined to be generated.

Figure 4:
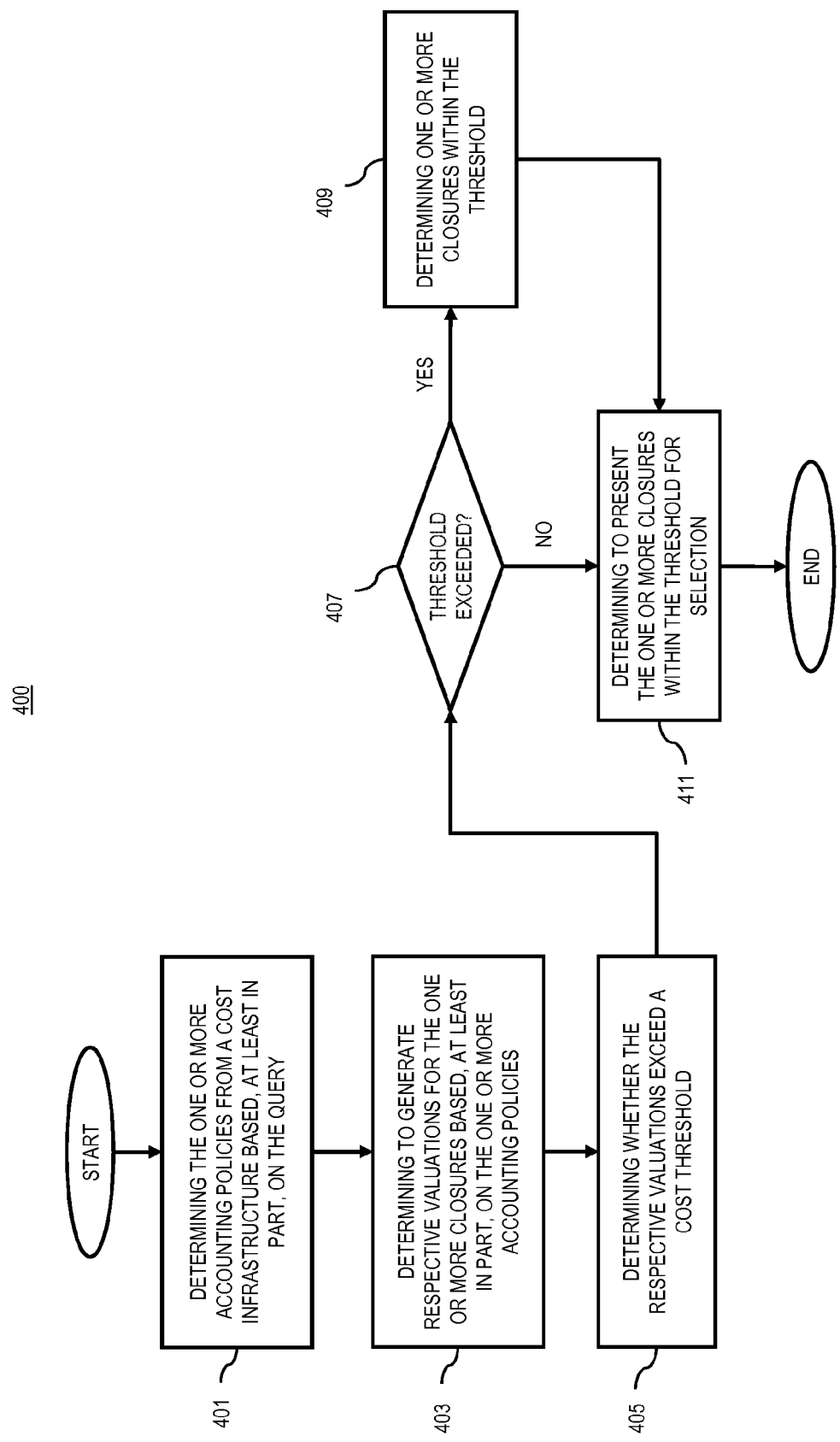
FIG. 4 is a flowchart of a process for enabling the valuation of closures associated with a request with respect to a cost threshold, according to one embodiment.

FIG. 4 is a flowchart of a process for enabling the valuation of closures associated with a request with respect to a cost threshold, according to one embodiment. In one embodiment, the CPAI 103 performs the process 400 and is implemented in, for instance, a chip set including a processor and a memory as shown in FIG. 7. By way of example, this process 400 corresponds to modules 215-221 of the CPAI 103 of FIG. 2. As a first step 401, one or more accounting policies are determined from a cost infrastructure based on a received query. As a next step 403, respective valuations are determined to be generated. The valuations are based, at least in part, on the determined accounting policies of step 401. As a next step 405, a determination is made as to whether the respective valuations exceed a cost threshold value. When the cost threshold is exceeded in accord with decision step 407, a next step 409 entails a determining of one or more closures that are within the threshold. Next, as presented with respect to step 411, a determining to present the one or more closures within the threshold for selection is performed. Step 411 is also performed in the instance where the threshold is not exceeded per decision step 407.

Figure 5:
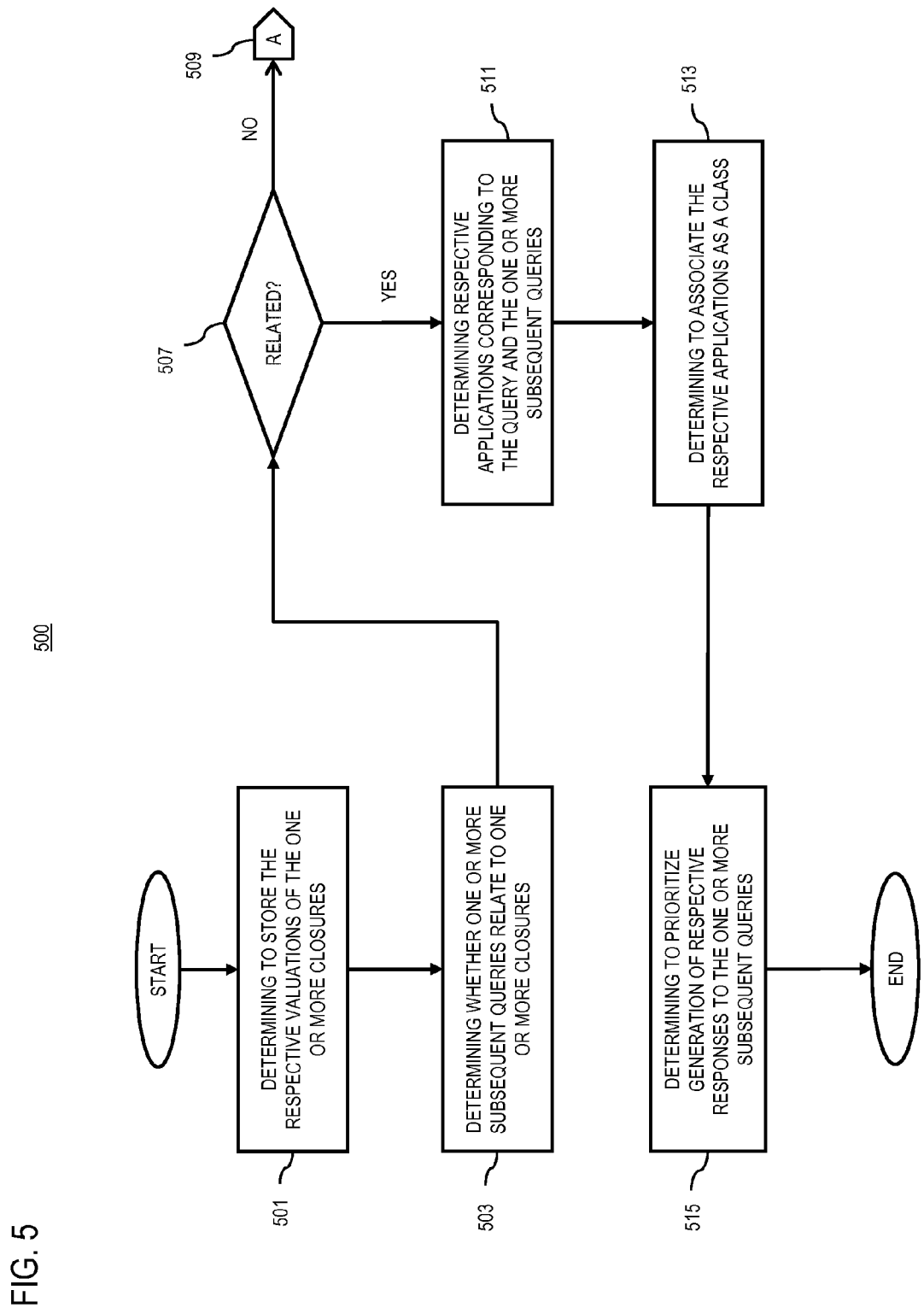
FIG. 5 is a flowchart of a process for enabling subsequent queries related to one or more closures to be associated with a particular application as a class, according to one embodiment.

FIG. 5 is a flowchart of a process for enabling subsequent queries related to one or more closures to be associated with a particular application as a class, according to one embodiment. In one embodiment, the CPAI 103 performs the process 500 and is implemented in, for instance, a chip set including a processor and a memory as shown in FIG. 7. Execution of this procedure 500, enabled by way of, for instance, one or more of modules 215-221 of FIG. 2, enables consecutive query requests or application needs to be appropriately managed respective to cost or accounting infrastructure considerations by the CPAI 103. As a first step 501, respective valuations of the one or more closures as acquired or generated by the CPAI 103 are determined to be stored. In a next step 503, it is determined whether one or more subsequent queries as received by the CPAI relate to one or more of the already generated closures corresponding to the originating query. When a determination is made that no relation exists, as in decision step 507, then the procedure as referenced by off page reference indicator A 509 to FIG. 3, beginning with step 303 is performed. By way of example, this indicates execution on the part of the CPAI 103 based on a recognition that subsequent queries must be responded to independent of, but in the same manner as the current query or application need, such that consistent results are attained by the CPAI 103.

When a determination is made that a relation exists between the subsequent query and one or more generated and/or acquired closures, as in decision step 507, next step 511 entails determining respective applications corresponding to the one or more subsequently received queries. As yet another step 513, it is determined to associate the respective applications as a class—i.e., a defined set of related executable closures or procedures to be carried out respective to their intended application. For example, a class may define a series of computation closures necessary to carry out a query request. As a further step 515, it is determined to prioritize generation of respective responses to the one or more subsequent queries. The prioritization promotes enablement of sequential or consecutive closure execution by the CPIA 103 respective to a query, application need or class thereof.

The processes described herein for enabling the accounting of closures to support query requests established by a device may be advantageously implemented via software, hardware, firmware or a combination of software and/or firmware and/or hardware and/or communication and data serialization protocols. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
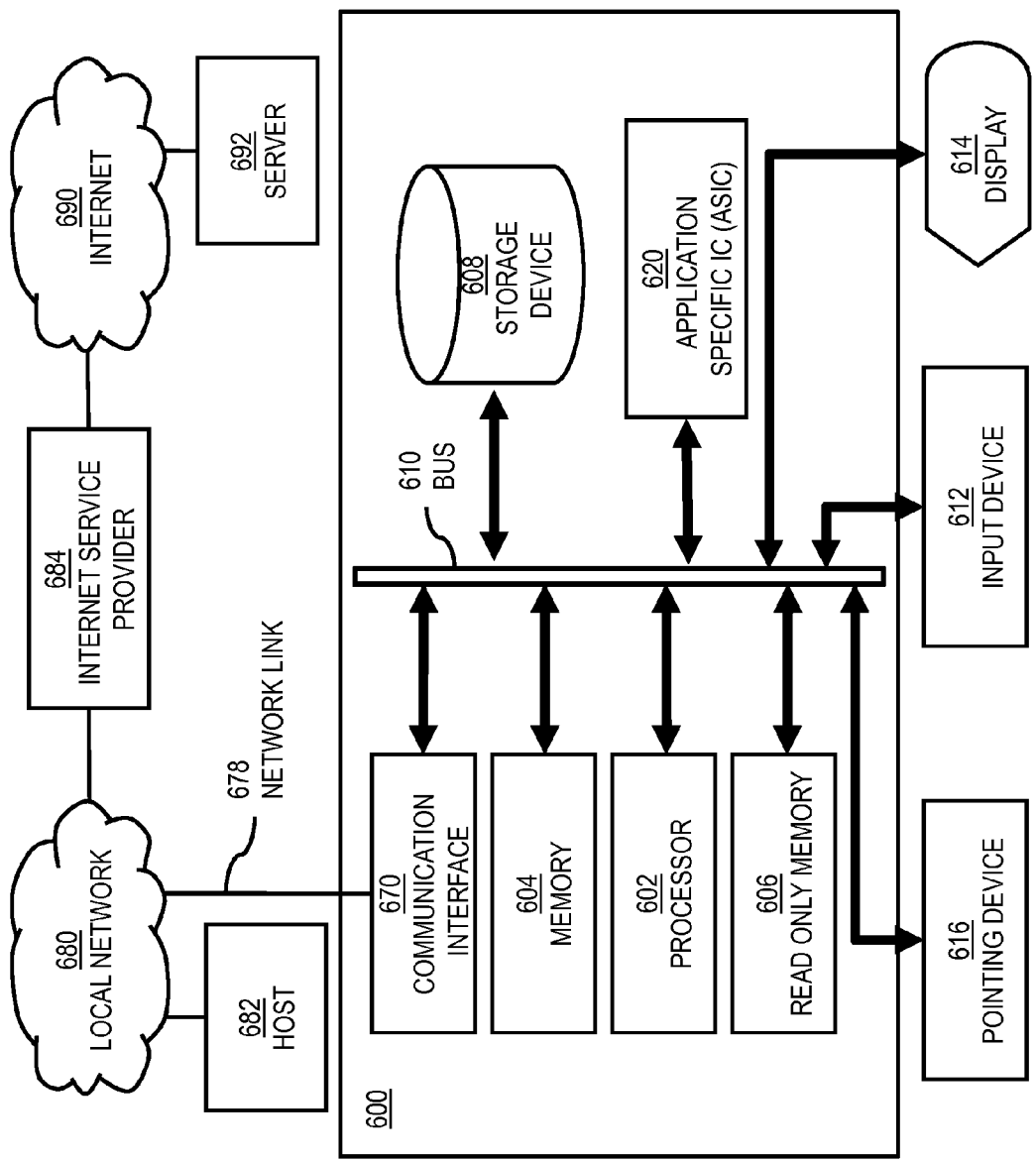
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to enable the accounting of closures to support query requests established by a device as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of enabling the accounting of closures to support query requests established by a device.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to enabling the accounting of closures to support query requests established by a device. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or other dynamic storage device, stores information including processor instructions for enabling the accounting of closures to support query requests established by a device. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for enabling the accounting of closures to support query requests established by a device, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT) or a liquid crystal display (LCD), or plasma screen or printer for presenting text or images, and a pointing device 616, such as a mouse or a trackball or cursor direction keys, or motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of application specific ICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for enabling the accounting of closures to support query requests established by a device to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to enable the accounting of closures to support query requests established by a device as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of services. Chip set or chip 700, or a portion thereof, constitutes a means for performing one or more steps of enabling the accounting of closures to support query requests established by a device.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to enable the accounting of closures to support query requests established by a device. The memory 705 also stores the data associated with or generated by the execution of the inventive steps.

Figure 8:
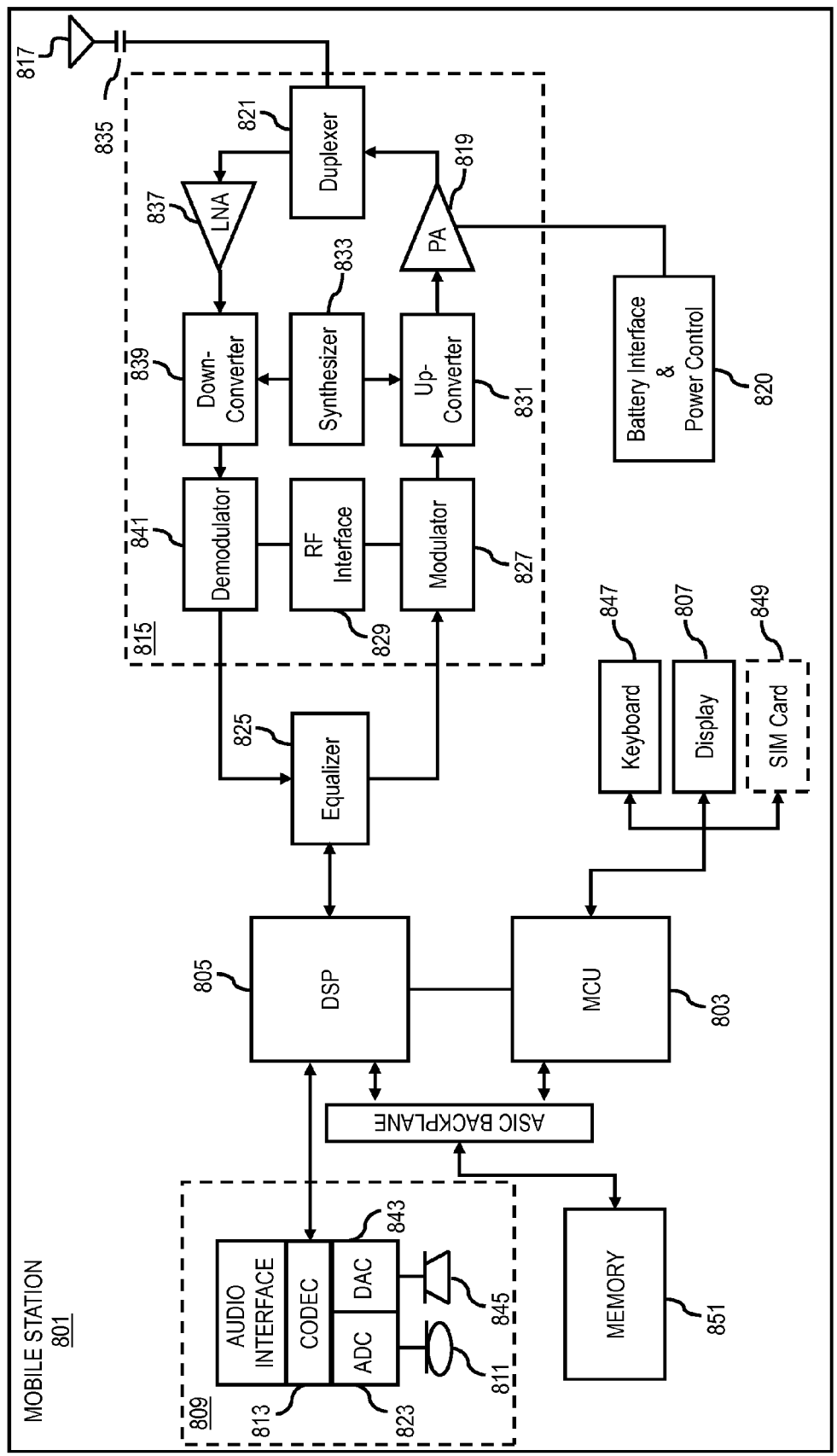
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 800, or a portion thereof, constitutes a means for performing one or more steps of enabling the accounting of closures to support query requests established by a device. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of enabling the accounting of closures to support query requests established by a device. The display 8 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803—which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to enable the accounting of closures to support query requests established by a device. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   receiving a query from a device;
   determining with a processor one or more closures based, at least in part, on the query, wherein the one or more closures are associated with at least one of an information space or a computation space;
   determining with the processor to select at least one of the one or more closures based, at least in part, on one or more predetermined policies, wherein the one or more predetermined policies include one or more accounting policies;
   determining with the processor to generate a response to the query based, at least in part, on the selected at least one of the one or more closures;
   determining the one or more accounting policies from a cost infrastructure based, at least in part, on the query;
   determining to generate respective valuations for the one or more closures based, at least in part, on the one or more accounting policies; and
   determining whether the respective valuations exceed a cost threshold,
   wherein the cost threshold is a maximum level of cost that a user of the device is willing to assume, and
   wherein the selecting of the at least one of the one or more closures is based, at least in part, on the respective valuations and on the determination with respect to the cost threshold.

2. A method of claim 1, further comprising:
   determining to store the respective valuations of the one or more closures;
   determining whether one or more subsequent queries relate to one or more closures; and
   determining to prioritize generation of respective responses to the one or more subsequent queries based, at least in part, on the determination with respect to whether the one or more subsequent queries are related to the one or more closures.

3. A method of claim 2, further comprising:
   determining respective applications corresponding to the query and the one or more subsequent queries; and
   determining to associate the respective applications as a class based, at least in part, on the determination with respect to whether the one or more subsequent queries are related to the one or more closures.

4. A method of claim 1, further comprising:
   determining whether the one or more closures are provided by one or more external providers,
   wherein the selecting of the at least one of the one or more closures is based, at least in part, on the determination with respect to the external provider.

5. A method of claim 4, further comprising:
   determining a cost associated with the determining of whether the one or more closures are provided by the one or more external providers,
   wherein the selecting of the at least one of the one or more closures, the determining of whether the one or more closures are provided by the one or more external providers, or a combination thereof are based, at least in part, on the cost.

6. A method of claim 1, wherein the cost infrastructure is based, at least in part, on a type of user associated with the device, a type of the one or more closures, a cost associated with the one or more closures, an availability of alternate sources of the one or more closures, or a combination thereof.

7. A method of claim 1, wherein the policies are based, at least in part, on a common ontology for the information space or the computation space, a lifetime value of a user associated with the device, or a combination thereof.

8. An apparatus comprising:
   at least one processor; and
   at least one memory including computer program code for one or more programs,
   the at least one memory and the computer program code configured to, with the at least one processor, cause the apparatus to perform at least the following,
   receive a query from a device;
   determine one or more closures based, at least in part, on the query, wherein the one or more closures are associated with at least one of an information space or a computation space;
   determine to select at least one of the one or more closures based, at least in part, on one or more predetermined policies, wherein the one or more predetermined policies include one or more accounting policies;
   determine to generate a response to the query based, at least in part, on the selected at least one of the one or more closures;
   determine the one or more accounting policies from a cost infrastructure based, at least in part, on the query;
   determine to generate respective valuations for the one or more closures based, at least in part, on the one or more accounting policies; and determine whether the respective valuations exceed a cost threshold, wherein the cost threshold is a maximum level of cost that a user of the device is willing to assume, and wherein the selecting of the at least one of the one or more closures is based, at least in part, on the respective valuations and on the determination with respect to the cost threshold.

9. An apparatus of claim 8, wherein the apparatus is further caused to:

determine to store the respective valuations of the one or more closures;

determine whether one or more subsequent queries relate to one or more closures; and determine to prioritize generation of respective responses to the one or more subsequent queries based, at least in part, on the determination with respect to whether the one or more subsequent queries are related to the one or more closures.

10. An apparatus of claim 9, wherein the apparatus is further caused to:

determine respective applications corresponding to the query and the one or more subsequent queries; and determine to associate the respective applications as a class based, at least in part, on the determination with respect to whether the one or more subsequent queries are related to the one or more closures.

11. An apparatus of claim 8, wherein the apparatus is further caused to:

determine whether the one or more closures are provided by one or more external providers, wherein the selecting of the at least one of the one or more closures is based, at least in part, on the determination with respect to the external provider.

12. An apparatus of claim 11, wherein the apparatus is further caused to:

determine a cost associated with the determining of whether the one or more closures are provided by the one or more external providers, wherein the selecting of the at least one of the one or more closures, the determining of whether the one or more closures are provided by the one or more external providers, or a combination thereof are based, at least in part, on the cost.

13. An apparatus of claim 8, wherein the cost infrastructure is based, at least in part, on a type of user associated with the device, a type of the one or more closures, a cost associated with the one or more closures, an availability of alternate sources of the one or more closures, or a combination thereof.

14. An apparatus of claim 8, wherein the policies are based, at least in part, on a common ontology for the information space or the computation space, a lifetime value of a user associated with the device, or a combination thereof.

15. A non-transitory computer-readable storage medium carrying one or more sequences of one or more instructions which, when executed by one or more processors, cause an apparatus to at least perform the following steps:

receiving a query from a device;

determining one or more closures based, at least in part, on the query, wherein the one or more closures are associated with at least one of an information space or a computation space;

determining to select at least one of the one or more closures based, at least in part, on one or more predetermined policies, wherein the one or more predetermined policies include one or more accounting policies;

determining to generate a response to the query based, at least in part, on the selected at least one of the one or more closures;

determining the one or more accounting policies from a cost infrastructure based, at least in part, on the query;

determining to generate respective valuations for the one or more closures based, at least in part, on the one or more accounting policies; and determining whether the respective valuations exceed a cost threshold, wherein the cost threshold is a maximum level of cost that a user of the device is willing to assume, and wherein the selecting of the at least one of the one or more closures is based, at least in part, on the respective valuations and on the determination with respect to the cost threshold.

* * * * *